United States Patent
Volk et al.

(10) Patent No.: US 10,457,101 B2
(45) Date of Patent: Oct. 29, 2019

(54) PNEUMATIC VEHICLE TIRE

(71) Applicant: Continental Reifen Deutschland GmbH, Hannover (DE)

(72) Inventors: Heiner Volk, Neustadt (DE); Christian Struebel, Hannover (DE); Norbert Mueller, Nienhagen (DE)

(73) Assignee: Continental Reifen Deutschland GmbH, Hannover (DE)

(*) Notice: Subject to any disclaimer, the term of this patent is extended or adjusted under 35 U.S.C. 154(b) by 459 days.

(21) Appl. No.: 14/869,332

(22) Filed: Sep. 29, 2015

(65) Prior Publication Data

US 2016/0016435 A1    Jan. 21, 2016

Related U.S. Application Data

(63) Continuation of application No. PCT/EP2014/052769, filed on Feb. 13, 2014.

(30) Foreign Application Priority Data

Apr. 4, 2013  (DE) .......................... 10 2013 103 367

(51) Int. Cl.
*B60C 11/00* (2006.01)
*B60C 11/03* (2006.01)

(52) U.S. Cl.
CPC ...... *B60C 11/0058* (2013.01); *B60C 11/0008* (2013.01); *B60C 11/0327* (2013.01); *B60C 2011/0025* (2013.01); *B60C 2011/0341* (2013.01)

(58) Field of Classification Search
CPC .................................................. B60C 11/0058
See application file for complete search history.

(56) References Cited

U.S. PATENT DOCUMENTS

| | | | |
|---|---|---|---|
| 4,319,620 A | * | 3/1982 | Knill .................... B60C 1/0016 152/209.5 |
| 4,385,653 A | | 5/1983 | Okazaki et al. |
| 4,580,608 A | | 4/1986 | Rampl |
| 4,739,811 A | | 4/1988 | Rampl |
| 9,358,840 B2 | | 6/2016 | Bijaoui |

(Continued)

FOREIGN PATENT DOCUMENTS

| | | | |
|---|---|---|---|
| DE | 10 2008 018 340 A1 | | 10/2009 |
| DE | 10 2008 018 345 A1 | | 10/2009 |
| DE | 102008018340 | * | 10/2009 |
| DE | 102008018345 | * | 10/2009 |
| EP | 0602989 | * | 6/1994 |
| EP | 0 798 142 A1 | | 10/1997 |

(Continued)

OTHER PUBLICATIONS

English machine translation of EP1609624. (Year: 2005).*

(Continued)

*Primary Examiner* — Robert C Dye

(57) ABSTRACT

A pneumatic vehicle tire for passenger cars, vans or the like has a radial carcass, a multi-ply belt, and a profiled tread that, as viewed in the axial direction, has a central portion and two shoulder portions. The shoulder portions include a rubber mixture that has a lower dynamic modulus of elasticity E' (at 55° C. and 8% elongation according to DIN 53513) than the central portion. The central portion has extensions at the base thereof, running laterally substantially parallel to the tread substructure and radially inside and across the width of the shoulder portions.

1 Claim, 1 Drawing Sheet

(56) References Cited

U.S. PATENT DOCUMENTS

| | | | |
|---|---|---|---|
| 2004/0112490 A1* | 6/2004 | Sandstrom | B60C 11/18 152/152.1 |
| 2011/0048599 A1* | 3/2011 | Ryba | B60C 1/0016 152/209.5 |

FOREIGN PATENT DOCUMENTS

| | | | |
|---|---|---|---|
| EP | 1609624 | * | 12/2005 |
| EP | 2594413 A1 | | 5/2013 |
| FR | 2952855 A1 | | 5/2011 |
| JP | 2008-24045 A | | 2/2008 |

OTHER PUBLICATIONS

Gent, Alan and Walter, Joseph, "Pneumatic Tire," Sep. 18, 2006, Department of Mechanical Engineering, University of Akron, p. 40-41. (Year: 2006).*

English machine translation of DE102008018345. (Year: 2008).*
English machine translation of DE102008018340. (Year: 2009).*
International Search Report dated Apr. 4, 2014 of international application PCT/EP2014/052769 on which this application is based.
Klaas, A. et al, "TIME, Tire Measurements a new standard test procedure for stationary cornering measurements of tires", VDI reports, issue 1494, VDI Verlag GmbH, ISSN: 0083-5560, 1999, pp. 119 to 137 and English translation.
DIN 53512, "Determining the rebound resilience of rubber using the Schob pendulum", DIN Deutsches Institut fuer Normung, e.V., Beuth Verlag GmbH, Berlin, Germany, Apr. 2000, pp. 1 to 5 and English translation thereof.
DIN 53513, "Determination of viscoelastic properties of elastomers on exposure to forced vibration at non-resonant frequencies", DIN Deutsches Institut fuer Normung, e.V., Beuth Verlag GmbH, Berlin, Germany, Mar. 1990, pp. 1 to 8 and English translation thereof.
ISO 28580, "Passenger car, truck and bus tyres—Methods of measuring rolling resistance—Single point test and correlation of measurement results", First edition, copyright ISO, Jul. 1, 2009, pp. ii to 26.

* cited by examiner

PNEUMATIC VEHICLE TIRE

CROSS REFERENCE TO RELATED APPLICATIONS

This application is a continuation application of international patent application PCT/EP2014/052769, filed Feb. 13, 2014, designating the United States and claiming priority from German application 10 2013 103 367.9, filed Apr. 4, 2013, and the entire content of both applications is incorporated herein by reference.

FIELD OF THE INVENTION

The disclosure relates to a pneumatic vehicle tire for passenger vehicles, vans or the like, with a radial ply casing, a multi-ply belt and a profiled tread which, as viewed in the axial direction, has a central portion and two shoulder portions, wherein the shoulder portions are composed of a rubber compound which has a lower dynamic modulus of elasticity E' (at 55° C. and 8% elongation according to DIN 53513) than the central portion.

BACKGROUND OF THE INVENTION

A pneumatic vehicle tire of this type is known from JP 2008 024 045 A. This tire is provided with a tread which has a base layer which runs in the form of a thin layer within a central tread portion and which at the same time forms the shoulder portions in the tread. The base layer and therefore also the two lateral shoulder portions are composed of a rubber compound with a lower dynamic modulus of elasticity and a higher rebound resilience than the central portion of the tread, and therefore the rubber compound with the lower rolling resistance is provided in the shoulder portions of the tread.

U.S. Pat. No. 4,385,653 A discloses a pneumatic vehicle tire which is provided for passenger vehicles and the tread of which is formed as a single part and likewise has a central portion made of a first rubber composition and two shoulder portions made of a second rubber composition. The one rubber composition is intended to have a low loss due to hysteresis and is based, for example, on natural rubber, isoprene rubber and butadiene rubber. The second rubber composition having a higher loss due to hysteresis contains, for example, exclusively styrene-butadiene rubber as the rubber component. The rubber composition with the lower loss due to hysteresis is used in the central portion of the tread and therefore has a lower rolling resistance than the rubber compound in the lateral portions, which rubber compound has better wet grip. U.S. Pat. Nos. 4,580,608 and 4,739,811 disclose a pneumatic vehicle tire in which the tread is composed of a tread cap and a tread base, wherein the tread base is of trough-like configuration in cross section and the tread cap is inserted into the tread base. The tread base therefore extends on the shoulder side as far as the surface of the tread. A greater portion of the volume of the running surface is thereby intended to be assigned to the tread base, and therefore the qualitative properties of the rubber compound of the tread base can have a quantitatively greater effect on the tread.

The rolling resistance correlates with the rebound resilience of a rubber compound, wherein a high rebound resilience results in a lower rolling resistance. The handling properties, in particular the cornering stiffness, vary with the dynamic stiffness of a rubber compound, wherein a relatively high value also signifies a high cornering stiffness. If appropriate rubber compounds are therefore used in the central region of the tread and in the two shoulder regions, the rolling resistance in the case of acceptable handling properties can be reduced.

SUMMARY OF THE INVENTION

It is an object to improve a pneumatic vehicle tire of the type mentioned above so that a conflict of objectives between a reduction in the rolling resistance and good handling properties, in particular high cornering stiffness, is solved in a better way than in the case of the known pneumatic vehicle tires.

The object is achieved in that the base of the central portion has extensions running laterally substantially parallel to the tread substructure and radially within and over the length of the shoulder portions.

Accordingly, the stiffer rubber compound with the greater dynamic modulus of elasticity E' from the central portion is therefore continued below the softer compounds in the shoulder portions. It has been determined that this measure results in a special deformation behavior of the tire during rolling, the deformation behavior being highly advantageous especially for the handling properties, in particular the cornering stiffness, with a low rolling resistance remaining. Furthermore, the stiffer extensions make it possible to configure the rubber compound in the shoulder portions to be particularly low in rolling resistance. Furthermore, tread substructure is understood as meaning the substructure of the tread or the component directly adjoining radially within the tread, such as, for example, the tread base, if the tread is formed from cap and base, or a lower plate.

According to a preferred embodiment, the extensions have an at least substantially constant thickness of between 1.0 mm and 2.0 mm. With extensions of a thickness within this range, the conflict of objectives between low rolling resistance and high cornering stiffness can be particularly readily resolved.

The disclosure pertains to treads having any profilings and any construction, whether as a single part or in two parts, and including a tread cap and a tread base. However, it is advantageous if the profiling permits a type of functional separation between the shoulder portions and the central portion. This is possible, for example, in the case of treads in which a respective circumferential groove which preferably runs at least substantially rectilinearly and in the circumferential direction is arranged between the shoulder portions and the central portion. In such an embodiment of the tread, the extensions can run between the groove base of the circumferential grooves and the shoulder regions of the tire.

In the already mentioned embodiment of the tread including a tread base and a tread cap, the shoulder portions together with the central portion and the two extensions form the tread cap.

In order to obtain particularly balanced and good results with respect to low rolling resistance and better cornering stiffness, it is advantageous if the central portion has a width of between 30% and 70% of the width of the ground contact area, depending on the tire width. In the case of wider tires, the central portion is configured to be relatively wider than in the case of narrower tires; in contrast, the width of the two shoulder portions is substantially independent of the tire width and is preferably approximately identical in size for wider and narrower tires.

The shoulder portions can have corresponding widths. By contrast, in the case of "asymmetrically designed" tread profiles, it may be advantageous if the widths of the two shoulder portions differ from each other by in particular up to 50%.

The two extensions of the central portion permit the rubber compound of the shoulder portions to be configured to be particularly low in rolling resistance. The shoulder portions can therefore be composed of a rubber compound, the rebound resilience of which corresponds at least to the rebound resilience of the rubber compound in the central portion, and it is in particular advantageous if the rebound resilience of the rubber compound in the shoulder portions is greater than the rebound resilience of the rubber compound in the central portion.

In order to particularly readily resolve the conflict of objectives existing between low rolling resistance and good cornering stiffness, without having a negative influence on other tread properties, such as, for example, the abrasion resistance and the like, it is advantageous to appropriately configure the rubber compounds for the central portion and the two shoulder portions with regard to the dynamic modulus of elasticity E' of the compounds and the rebound resilience thereof.

In this context, it is therefore advantageous if the dynamic modulus of elasticity E' of the rubber compound of the two shoulder portions is between 30% and 90%, in particular between 40% and 80%, of the dynamic modulus of elasticity E' of the rubber compound of the central portion of the tread.

In particular, the dynamic modulus of elasticity E' of the rubber compound of the shoulder portions should be between 2.0 N/mm$^2$ and 6.4 N/mm$^2$, in particular between 3.0 N/mm$^2$ and 5.7 N/mm$^2$. The dynamic modulus of elasticity E' of the rubber compound of the central portion should be between 3.9 N/mm$^2$ and 8.1 N/mm$^2$, in particular between 5.2 N/mm$^2$ and 7.7 N/mm$^2$. Particularly good cornering stiffness of the pneumatic vehicle tire is ensured precisely in these regions.

In order to keep the rolling resistance as low as possible, it is advantageous if the rubber compound of the central portion has a rebound resilience which is between 10% and 80% lower than the rebound resilience of the rubber compound of the shoulder portions. The rebound resilience of the rubber compound of the two shoulder portions should be between 40% and 90%, in particular between 50% and 80%. The rebound resilience of the rubber compound of the central portion should be between 15% and 70%, in particular between 20% and 60%.

BRIEF DESCRIPTION OF THE DRAWINGS

The disclosure will now be described with reference to the drawings wherein.

DESCRIPTION OF THE PREFERRED EMBODIMENTS OF THE INVENTION

Figure 1:
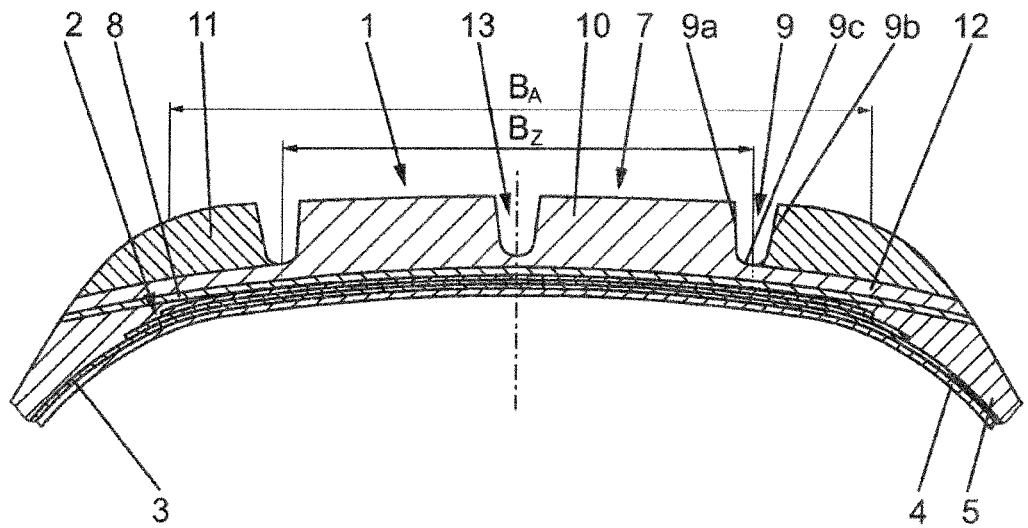
FIG. 1 shows schematically a cross section through the tread region of a pneumatic vehicle tire; and, FIG. 2 shows a diagram which illustrates the improvements in the rolling resistance and the cornering stiffness.

Pneumatic vehicle tires configured in accordance with the disclosure are provided or are particularly readily suitable for passenger vehicles, vans and the like. Of the customary components of a tire for passenger vehicles, FIG. 1 shows a tread 1, a belt 2, a radial ply casing 3, and an air-tight inner layer 4. In the example, the belt 2 has two belt plies which, in a known manner, can contain steel cord as a reinforcement. The ply casing 3 is reinforced in the customary manner with textile reinforcements. The belt 2 can be covered by a belt bandage (not shown) including rubberized textile reinforcements encircling the tire in the circumferential direction. Furthermore, the axially outer portions of side walls 5 are illustrated. Bead regions with bead cores, core profiles and the like are not shown.

The tread 1 can be configured as a single part, from a single rubber layer, or can be composed of two rubber layers, namely of a radially outer rubber layer, a tread cap 7, and a radially inner rubber layer, a tread base 8. A lower plate (not illustrated) can be installed radially within the tread base 8. The tread base 8 has a substantially constant thickness of in particular approximately 2 mm and is preferably composed of a rubber compound which is optimized with respect to rolling resistance. Even when the tread 1 is worn out, the tread base 8 does not come into contact with the underlying surface. The tread cap 7 is that part of the tread 1 in which the profiling with grooves, incisions and the like is placed, wherein, in the embodiment shown, the profiling has two shoulder-side circumferential grooves 9, which encircle the tire in an at least substantially rectilinearly manner in the circumferential direction. The circumferential grooves 9 are formed here at the maximum profile depth provided for the tread concerned. The profile can be configured in such a manner that circumferential grooves which reach as far as the maximum profile depth are not provided on the outer side of the tread and to the sides of the two circumferential grooves 9. The profiling of the tread 1 can in principle be configured as desired, wherein a central circumferential groove 13 encircling in the circumferential direction is also illustrated by the example of the profiling of FIG. 1.

Each circumferential groove 9 is bonded by a groove flank 9a on the inner side of the tread and a groove flank 9b on the outer side of the tread and by a groove base 9c, which can be configured in a known manner. The two groove flanks (9a, 9b) can be inclined at an acute angle of several degrees, in particular up to 10°, with respect to the radial direction, that is, perpendicular to the profile surface, in such a manner that the groove width becomes larger from the groove base 9c as far as the profile surface. As illustrated, the groove base 9c can be rounded and connects the two groove flanks 9a and 9b to each other. In the embodiment shown, the groove flanks 9b placed on the outer side of the tread bound shoulder portions 11 of the tread cap 7, which shoulder portions are composed of a rubber compound which, as will also be described, differs from the rubber compound of the central portion 10 located between the shoulder portions 11. Extensions 12 of the central portion 10 run radially within the shoulder portions 11, the extensions running along the substructure of the tread cap 7, that is, here along the tread base 8 and over the entire width of the shoulder portions 11, and having an at least substantially constant thickness which is of the order of magnitude of 1.0 mm to 2.0 mm. A portion of the groove base 9c adjoining the groove flanks 9b can at the same time bound the shoulder portions 11. In a differently configured tread profiling, the boundaries between the shoulder portions 11 and the central portion 10 do not run through/at circumferential grooves, but rather, for example, through or in profile bands.

The central portion 10 of the tread cap 7 extends with a constant or substantially constant axial width and preferably symmetrically with respect to the tire center over a width $B_z$ of 30% to 70% of the width $B_A$ of the tread 1 in the ground contact area which is determined with a tire mounted on a rim and placed under nominal pressure and nominal load (in accordance with the E.T.R.T.O. standard). In the case of wider tires, the central portion is relatively wider, and in the case of narrower tires is relatively smaller. The width of the two shoulder portions 11 can coincide, but the shoulder portions 11 can also differ in width—in the case of "asymmetrically designed tread profiles", in which the circumferential grooves 9 do not run symmetrically with respect to the center of the tire. In each case, the minimum width of the shoulder portions is 10% of the ground contact area $B_A$.

The two shoulder portions 11 of the tread cap 7 are composed of a rubber compound, the rebound resilience of which, at 70° C. according to DIN 53512 at least corresponds to, and is preferably greater than, the rebound resilience of the rubber compound of the central portion 10 and of the two extensions 12. The rubber compound of the shoulder portions 11 furthermore has a lower dynamic modulus of elasticity E', at 55° C. according to DIN 53513 (at 8% elongation), than the rubber compound of the central portion 10 and of the extensions 12 of the latter. It is particularly advantageous if the rubber compound in the shoulder portions 11 has a modulus of elasticity E', at 55° C., which is 2.0 N/mm² to 6.4 N/mm², in particular 3.0 N/mm² to 5.7 N/mm². The rubber compound in the central portion 10 has a modulus of elasticity E' which is 3.9 N/mm² to 8.1 N/mm², in particular 5.2N/mm² to 7.7 N/mm².

The rebound resilience of the rubber compound in the shoulder portions 11, at 70° C., is 40% to 90%, in particular 50% to 80%, and the rebound resilience of the rubber compound of the central portion 10 and of the extensions 12 thereof is 15% to 70%, in particular 20% to 60%.

Examples of typical rubber compounds for the central portion 10 and the two extensions 12 and for the shoulder portions 11 of the tread cap 7 can be gathered from Table 1. The portions of the compound components are stated in phr. SSBR 1 is a rubber with a glass transition temperature $T_g$ of between −25° C. and −30° C., SSBR 2 is a rubber with a glass transition temperature $T_g$ of between −17° C. and −24° C. The compound $M_1$ is an example of a compound for the central portion 10 and the extensions 12, and the compound $M_2$ is an example of a compound for the shoulder portions 11.

TABLE 1

| Components | $M_1$ | $M_2$ |
| --- | --- | --- |
| NR | 15 | 15 |
| SSBR 1 | 85 | |
| SSBR 2 | | 85 |
| Carbon black | 14 | 14 |
| Silica | 96 | 40 |
| Silane | 8 | 3 |
| Adhesive resin | 14 | 7 |
| DPG accelerator | 2 | 1.5 |
| CBS accelerator | 2 | 2 |
| Sulfur | 1.7 | 1.7 |

Figure 2:
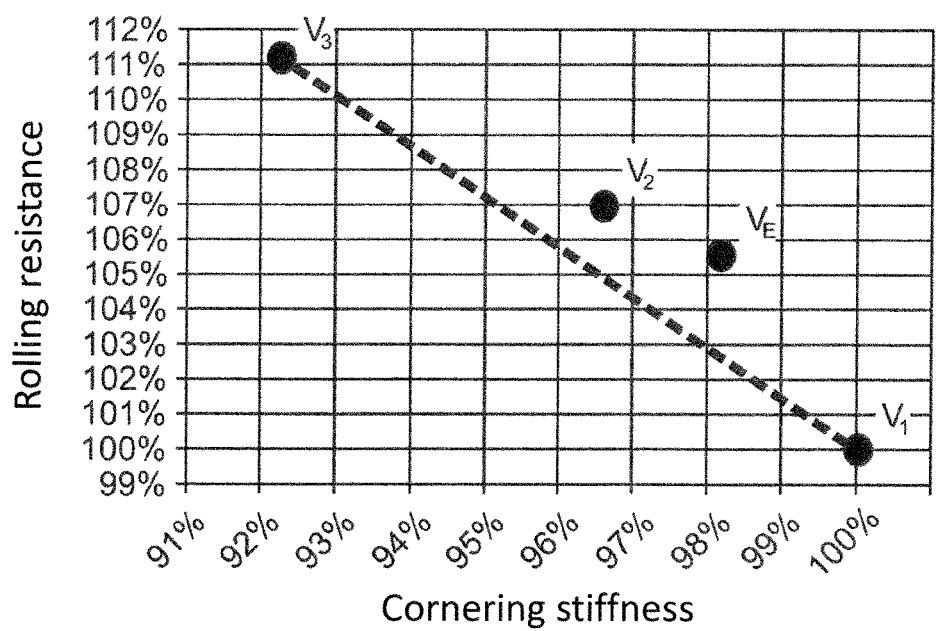

A test program was carried out with passenger vehicle tires of size 205/55 R 16 with differing construction of the tread and the rolling resistance and the cornering stiffness determined. The rolling resistance of the tires was determined according to ISO 28580, and the cornering stiffness according to TIME (measuring method, see VDI-Berichte (VDI reports), issue number: 1494, publisher: VDI Verlag GmbH, ISSN: 0083-5560). Table 2 below contains the four used tread variants of the tested tires and the measuring results. FIG. 2 graphically reproduces the measured values for the rolling resistance and the cornering stiffness. The tires of variant $V_1$ had a tread with a uniform tread cap composed of a single compound, the compound $M_1$, the tires of variant $V_3$ had a tread with a uniform tread cap composed of the compound $M_2$. The values for rolling resistance and cornering stiffness, determined with tires of variant $V_1$ were set to 100%. The tires of variant $V_E$ had a tread cap configured according to the present disclosure, the tires of variant $V_3$ had a tread cap composed of a central portion and two shoulder portions, but without extensions of the central portion. In FIG. 2, a straight line in the form of a dashed line is drawn between the measuring results of variants $V_1$ and $V_3$, the two measuring points of variants $V_E$ and $V_2$ above the dashed line therefore both show an improvement, wherein the measuring point of variant $V_E$ is at a greater distance from the dashed line than the measuring point of variant $V_2$. Tires of variant $V_E$, which are configured according to the disclosure, therefore best reach the set target of particularly readily resolving the conflict of objectives between the rolling resistance and the good cornering stiffness.

TABLE 2

| Variant | $V_1$ | $V_E$ | $V_2$ | $V_3$ |
| --- | --- | --- | --- | --- |
| Central portion without extensions | $M_1$ | — | $M_1$ | $M_2$ |
| Central portion with extensions | — | $M_1$ | — | — |
| Shoulder portion | $M_1$ | $M_2$ | $M_2$ | $M_2$ |
| Portion of $M_1$ | 100% | 69% | 49% | 0% |
| Rolling resistance | 100.0% | 105.6% | 107.0% | 111.2% |
| Cornering stiffness | 100.0% | 98.2% | 96.6% | 92.3% |

It is understood that the foregoing description is that of the preferred embodiments of the invention and that various changes and modifications may be made thereto without departing from the spirit and scope of the invention as defined in the appended claims.

REFERENCE NUMBERS

1 Tread
2 Belt
3 Radial ply casing
4 Inner layer
5 Side wall
7 Tread cap
8 Tread base
9 Circumferential groove
9a Groove flank
9b Groove flank
9c Groove base
10 Central portion
11 Shoulder portion
12 Extension
13 Circumferential groove

What is claimed is:
1. A pneumatic vehicle tire comprising:
a radial ply casing;
a multi-ply belt and a profiled tread which, as viewed in the axial direction, has a central portion and two shoulder portions, wherein the shoulder portions are composed of a first rubber compound that has a lower dynamic modulus of elasticity E' at 55° C. and 8% elongation according to DIN 53513 than a second rubber in the central portion of the pneumatic tire profiled tread, and wherein the first rubber compound comprises a solution styrene-butadiene rubber (SSBR) having a glass transition temperature (Tg) of between −24° C. to 17° C. and the second rubber compound comprises an SSBR having a glass transition temperature (Tg) of between −30° C. to −25° C.; and, wherein a base of the central portion has extensions positioned laterally substantially parallel to the tread substructure, wherein the base of the central portion has extensions positioned radially within and over the width of the shoulder portions, wherein separating each shoulder portion from the central portion is a shoulder-side circumferential groove that encircles the tire in a substantially rectilinear manner in the circumferential direction, wherein each shoulder-side circumferential groove is bonded by a first groove flank on an inner side of the tread, a second groove flank on an outer side of the tread, and a third groove flank that is a groove base, wherein the first groove flank and the second groove flank are inclined at an acute angle of up to 10 degrees with respect to the radial direction, and wherein the first rubber compound comprises 40 phr of silica and 14 phr of carbon black, and wherein the second rubber compound comprises 96 phr of silica and 14 phr of carbon black.

\* \* \* \* \*